Sept. 14, 1943.                N. W. DORMAN ET AL                    2,329,254
                                 VALVE MECHANISM
                      Filed Nov. 9, 1940                3 Sheets-Sheet 2
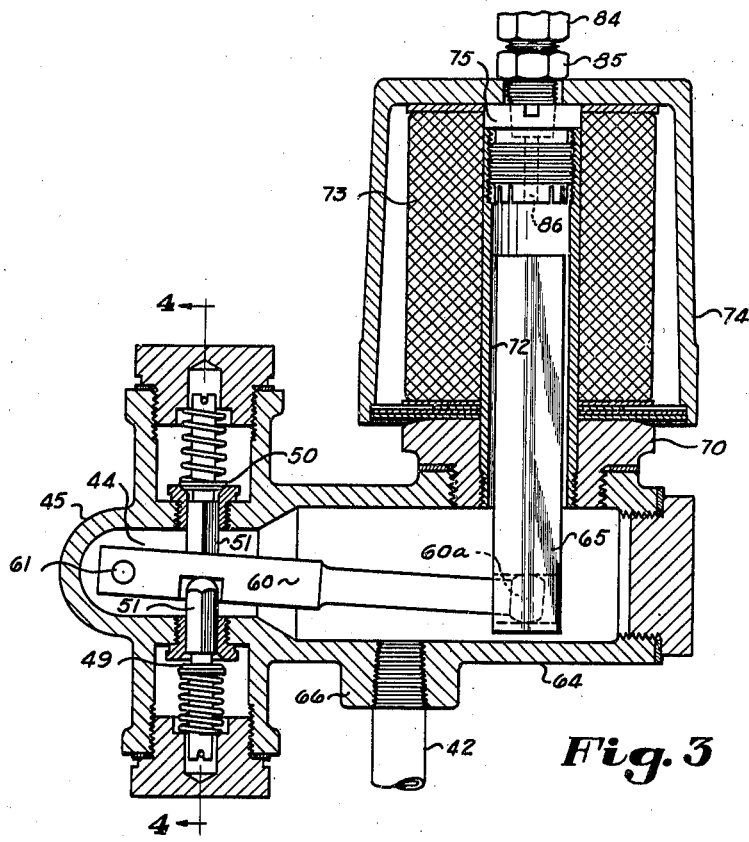
Fig. 3
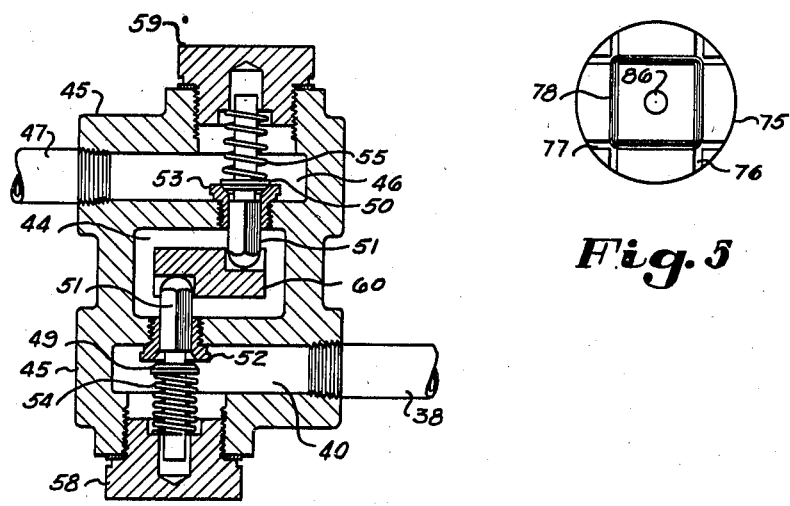
Fig. 4
Fig. 5
INVENTOR.
NEAL W. DORMAN AND ROBERT W. HADLEY
BY
Fay, Golrick, Williams & Fay
ATTORNEY.

Patented Sept. 14, 1943

2,329,254

UNITED STATES PATENT OFFICE 2,329,254

VALVE MECHANISM

Neal W. Dorman and Robert W. Hadley, Toledo, Ohio, assignors to E. W. Bliss Company, Brooklyn, N. Y., a corporation of Delaware Application November 9, 1940, Serial No. 365,092

6 Claims. (Cl. 137—139)

This invention is directed to improvements in electrically operated valves of the solenoid type, and the general object thereof is the provision of such a mechanism which will have an improved operating action of the solenoid upon the valve mechanism to be operated.

Our invention is directed also to an improved solenoid construction which is particularly adapted to the operation of fluid pressure controller valves.

A further object of the invention is the provision of a pneumatically operated valve mechanism in association with a solenoid operated controller valve mechanism therefor which will have a more positive and instant operation of the controller valve.

A still further object of the invention is the provision of a controller valve mechanism for controlling the main valve mechanism of a pneumatically operated clutch of a power press.

A still further object is the provision of a solenoid mechanism for use in the operation of fluid pressure control means and which will be such as to overcome any tendency of the armature of the solenoid mechanism to jam, stick, or be sluggish in the initiation of the operation of the armature when the solenoid is de-energized.

Other objects of the invention will become apparent from the description of the drawings illustrating a preferred embodiment thereof as hereinafter set forth.

The essential characteristics of the invention are summarized in the claims.

In the drawings:

Fig. 3 is an enlarged cross-sectional view of a solenoid operated valve controller mechanism taken substantially along the line 3—3 of Fig. 2;

Fig. 4 is a cross-sectional view of the valves of the controller taken substantially along the lines 4—4 of Fig. 3;

Fig. 5 is a bottom view of a shading coil comprising part of the solenoid structure;

Figure 2:
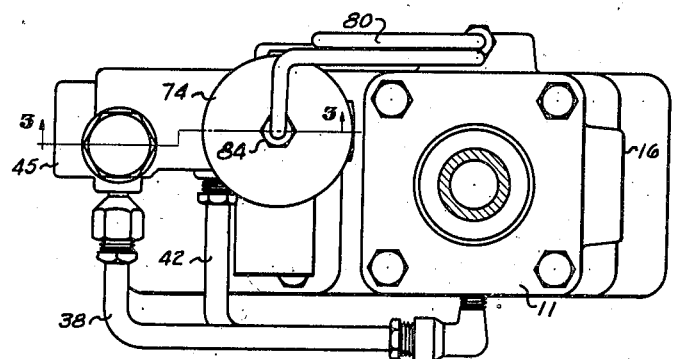
Fig. 2 is a plan view of the valve mechanism shown in Fig. 1.
Figure 1:
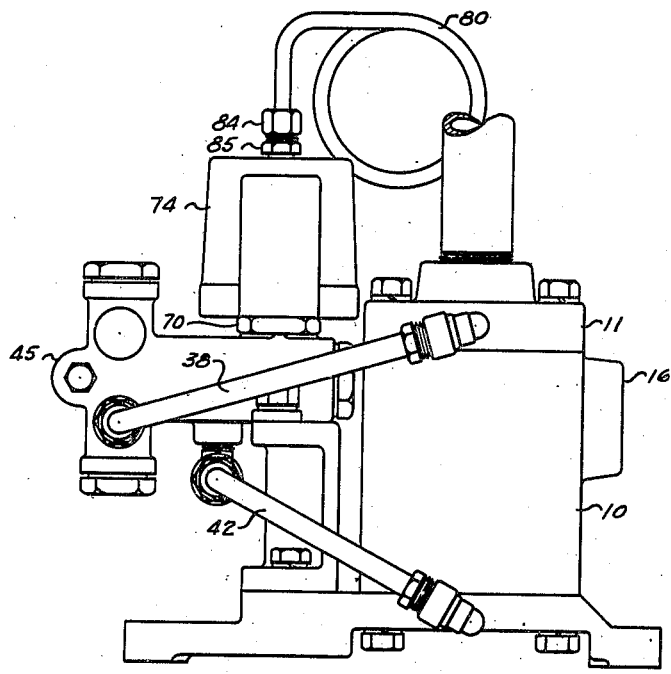
Fig. 1 is a side elevation of a valve mechanism incorporating the features of my invention.

Our invention contemplates improvements in the action of the armature of a solenoid which is operated in one direction under electrical influence and in the opposite direction by either gravity or mechanical influence, and in the particular embodiment illustrated in the drawings the invention is illustrated as being applied to the solenoid of a valve controller mechanism which controls the operation of a main valve mechanism, the main valve mechanism serving to apply or interrupt pneumatic pressure to a clutch mechanism, such for example as is used on modern power presses. Electrical energy to the solenoid coil may be controlled both manually and automatically as desired by electrical switch or controller mechanism conveniently stationed at the operator's position near the bed of the press, and which electrical controller mechanism comprises no part of this invention and accordingly is not shown. The improved mechanism is such that sluggishness in the action of the various movable members of the mechanism due to momentary hesitations in the action of the solenoid armature is eliminated.

Figure 6:
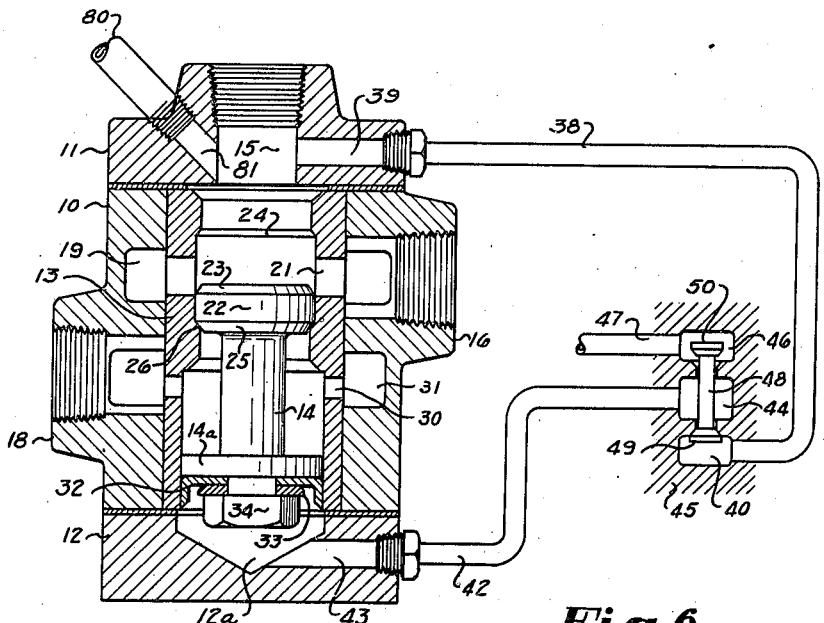
Fig. 6 is a cross-sectional view taken through the main valve mechanism and diagrammatically illustrating fluid connections between the valves of the valve controller mechanism.
Figure 7:
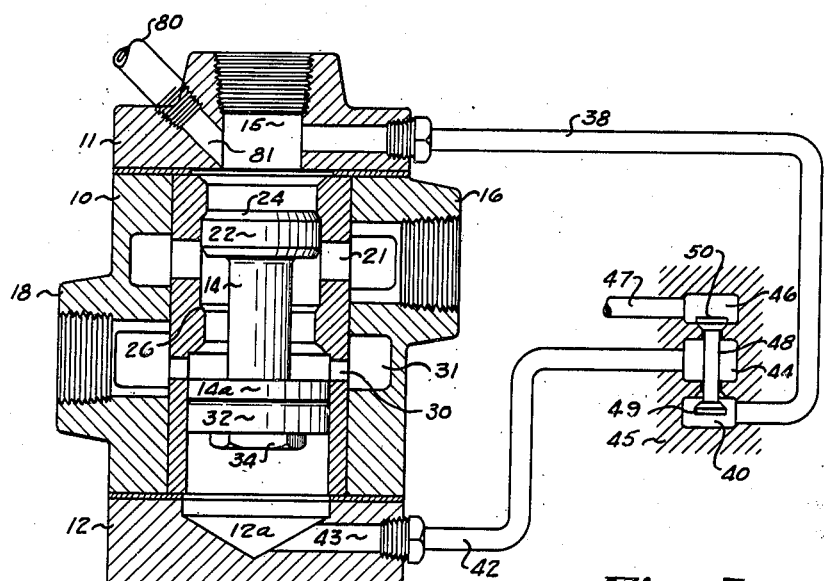
Fig. 7 is a view similar to Fig. 6 showing the position of the main valve members when fluid pressure to the mechanism to be operated has been shut off or interrupted.

Specifically, the main valve mechanism comprises a valve body 10 provided with an upper cap 11 which controls the pneumatic action upon the clutch, a lower cap 12, a ported sleeve 13 and a reciprocating valve member 14 of the piston operated type. The valve cap 11 is provided with an internally threaded central bore 15 to afford connection to a main air supply line. The valve body 10 is provided with a branch 16 suitably internally threaded for piping connection to the air line which is connected to the clutch mechanism or other mechanism to which the pneumatic action is to be applied. A second branch 18 is provided on the valve body 10 which comprises an exhaust outlet or connection to an exhaust line, as desired. The bore of the branch 16 extends into and communicates with an annular pressure cavity 19 formed within the valve body and the valve sleeve 13 is provided with ports 21 which establish communication between the inlet port 15 and the air line leading to the clutch. The valve member 14 is provided with an upper and lower seated valve head 22, the upper valve face 23 of which is adapted to close on a seat 24, formed within the valve sleeve 13 above the ports 21, and the lower valve face 25 of which is adapted to close upon a seat 26 formed within the valve sleeve 13 below the ports 21. Hence, when the valve head 22 is in its lowermost position, as shown in Fig. 6, air under pressure may flow through the port 15, ports 21 and branch 16 to the clutch. When the valve head 22 is in the uppermost position, as shown in Fig. 7, the air pressure is interrupted or shut off between thoe port 15 and branch 16 and no air pressure is being exerted upon the clutch or other mechanism to which the present invention is applied.

The exhaust of the air pressure within the clutch line is effected by permitting the air to escape therefrom inwardly through the ports 21 and downwardly through the valve sleeve to exhaust ports 30 in the sleeve 13 then to the annular cavity 31, formed within the valve body 10. The cavity 31 is in communication with the bore of the exhaust branch 18.

The valve 14 is provided, at its lower end, with a piston construction comprising a flange 14a, a flexible skirted disk member 32, a washer 33 and a clamping nut 34. The lower part of the valve sleeve 13 serves as a cylinder for the piston. The lower valve cap 12 is provided with a centrally located cavity 12a to which air under pressure is admitted to cause upward operation of the piston and valve member 14, and it will be noted that the diameter of the piston structure is greater than the diameter of the valve head 22, whereby a greater pressure area is afforded by the piston structure than by the valve head. The valve is operated to the downward position by effecting neutralization of the pressure within the cavity 12a, thus permitting the pressure on the upper face of the valve head 22 to effect rapid downward movement of the valve member 14.

Control of the pressure within the cavity 12a is effected by a controller mechanism, shown in cross-section in Figs. 3 and 4. This controller mechanism is for the purpose of passing the air under pressure from the inlet port 15 of the main valve mechanism around the main valve member 14 to the cavity 12a during one part of the cycle of operation of the main valve mechanism and to open the cavity 12a to the atmosphere during another part of the cycle of operation of the valve mechanism. Diagrammatically speaking, such an arrangement is shown in Figs. 6 and 7, there being a full line pressure duct or constant pressure line 38 communicating with a passageway 39 formed in the upper valve cap member 11 which is connected to a valve cavity 40 formed in a valve body 45 of the controller mechanism. Another connection 42 communicates with a passageway 43 formed in the lower valve cap member 12 and extending to the cavity 12a and which communicates with a cavity 44, formed in the controller valve body 45. A third cavity 46 is formed in the auxiliary valve body 45, to which the exhaust line or opening 47 communicates.

In Figs. 6 and 7 the valves for controlling the lines 38 and 42 are illustrated diagrammatically as a single valve plunger 48, having a lower valve head 49 and an upper valve head 50 which alternately seat and unseat to establish air pressure in the cavity 12a and to exhaust air pressure from the cavity 12a.

Actually, the valve indicated by the reference numeral 48 comprises two separate valve members 49 and 50, see Figs. 3 and 4, which are positioned in offset relation with the valve body 45, as shown in Fig. 4. These valve members 49 and 50 are operated to open positions by a lever member 60, as will be described hereafter.

The valve members 49 and 50 are provided with triangular shanks 51 disposed respectively to slide within the cylindrical bores of valve seat members 52 and 53, the latter being in threaded engagement with the upper and lower internal walls of the valve body 45. The valve members 49 and 50 are urged into seating position relative to the valve seat members 52 and 53 respectively, by spring members 54 and 55 positioned upon shank formations on the valve members 49 and 50. A lower cap member 58 and an upper cap member 59 are in threaded engagement with suitable bores formed in the valve body which serve as valve shank guides and seats for the spring members. The inner ends of the triangular shaped portions 51 of the valve members 49 and 50 are rounded and engage in notches or sockets formed in the valve operating lever 60.

The valve operating lever 60 has one end thereof pivotally mounted upon a pin 61 and the lever and pin are disposed within the valve cavity 44. The lever 60 is operated by the solenoid in such manner that the cooperating parts are all enclosed within the valve body 45. Hence the valve body is extended laterally from the valve housing portion thereof to have a hollow branch 64 which serves to completely enclose the lever 60 and also serves as a support for a solenoid mechanism, the armature 65 of which extends into the valve body and is connected to the free end of the lever 60 in the manner illustrated in Fig. 3. As shown, the lever is provided with a rounded end 60a which is operatively disposed within a bored cavity formed in the lower end of the armature 65.

A downwardly extending pipe connection or branch 66 is provided on the valve body 45, affording a connection to the lower pipe line 42, which establishes communication between the pressure cavity 12a of the main valve mechanism and the valve cavity 44 of the valve body 45.

The solenoid mechanism may comprise a base or supporting member 70 mounted upon the valve body 45 in air-tight or sealed relation thereto. Secured to the base 70 is a hollow core member or sleeve 72, the internal surface of which is cylindrical. The solenoid armature 65 may be hexagonal in cross sections whereby a substantially liberal fit is afforded between the inner sleeve surface and the hexagonal edges of the solenoid armature 65. The usual field coil 73 surrounds the sleeve 72 and the frame structure 74 is supported by the base 70 and serves to maintain the solenoid assembly. The upper end of the sleeve 72 is closed by a cap or plug member 75 and this member 75 has formed in the under end thereof pairs of slots 76 and 77 at right angles to each other and in which a shorted shading coil 78 is impacted.

The operation of the solenoid mechanism as so far described, would be dependent upon the influence of gravity to operate the solenoid armature 65 downwardly and consequently to shift the valve member 49 to the open position shown in Figs. 3 and 4. However, it has been found that this downward movement or falling action of the armature 65 is somewhat sluggish and that there is a tendency of the armature to remain in the uppermost position due to the influence of residual magnetism. To insure a more certain or definite initiation of the downward movement of the armature 65 within a given short lapse of time, we provide a means for more definitely initiating the downward operation of the armature and this means may be pneumatic or mechanical in its influence upon the armature. For example, the solenoid structure may be made in such a manner that we can utilize the prevailing air pressure which serves the main valve mechanism to overcome such sluggish action. Thus a connection or pressure line is provided which may extend either from the main air line pressure source or from a main pressure cavity of the main valve mechanism to a position immediately above the upper end of the solenoid armature 65, whereby this air pressure may be exerted upon the upper end area of the solenoid. Such a connection may comprise an air line 80 connected to a passageway 81 formed in the top cap member 11 of the main valve mechanism, as shown in Figs. 6 and 7 and the other end thereof may be connected as shown in Fig. 3 by a suitable nut 84 and coupling 85 to a central bore 86 formed in the solenoid coil member 75. Hence the downward action of the armature 65 is expedited and the operation of valve 49 made more definite with the result that the quick establishment of pressure within the cavity 12a of the main valve mechanism and prompt action of the piston and valve 14, to shut off pressure to the clutch, is assured.

It will be noted that in the means shown for initiating the down action of the plunger 65, the armature in its upward stroke abuts against the slotted lower face of the plug member 75 or 75a and the design of the parts is such that should any burrs form thereon due to wear or impact of the members, no sticking or increased resistance to the downward initial motion of the solenoid armature will develop.

We claim:

1. In a valve mechanism for controlling a pneumatically operated mechanism, in combination a pneumatically operated main valve, a controller valve for operating said main valve, a member in said controller valve adapted alternately to open ports for admission of compressed air to said main valve or for escape therefrom to an exhaust pipe, a solenoid having its armature mechanically connected to operate said member and means for exerting pneumatic pressure upon the armature to influence the initiation of the operation thereof when the solenoid is deenergized, said last mentioned means being connected to the compressed air line of the valve mechanism.

2. The combination of a main valve mechanism of the piston type pneumatically operated for controlling air pressure to an air operated clutch, a controller valve mechanism for controlling the pneumatic operation of the main valve mechanism, said controller mechanism including a pair of mechanically operated valve members for controlling the pressure to the piston of the main valve mechanism, a pivoted member for operating said valve members and a solenoid having its armature mechanically connected to said pivoted member, said armature being in reciprocable relation to a core sleeve of the solenoid structure, and means in connection with the pressure line of the pneumatically operated valve for exerting pneumatic pressure upon an end of the armature.

3. The combination of a main valve mechanism having a pneumatically operated piston valve member for controlling air pressure to an air operated clutch, a controller valve mechanism for controlling a pressure line leading to the piston valve member and thereby control the operation of the main valve mechanism, said controller mechanism including a pair of mechanically operated valve members, solenoid operated means for operating said valve members, and a solenoid mechanism including a solenoid armature having an end thereof connected to said valve operating means and the other end fitted in substantially airtight relation to an air port formed in the solenoid structure whereby pneumatic pressure derived from the pressure line of the pressure operated valve may be exerted upon the said other armature end.

4. The combination of a main valve mechanism of the piston type pneumatically operated for controlling air pressure to a air operated clutch with a controller valve mechanism, said controller mechanism including a pair of mechanically operated valve members for controlling the pressure to the piston of the main valve mechanism, a pivoted member for operating said valve members and a solenoid having its armature mechanically connected to said pivoted member, said solenoid armature being in reciprocable relation to a core sleeve of the solenoid structure, and means for exerting pneumatic pressure upon an end of the armature including an air line connecting a passage of the pressure operated main valve to the space above the armature.

5. In a valve mechanism of the piston type for controlling air pressure to an air operated clutch, in combination a pneumatically operated main valve mechanism, a controller valve mechanism for controlling the pneumatic operation of the main valve mechanism and solenoid operated means for actuating the controller valve members, said solenoid being adapted positively to operate a member of said controller valve mechanism in one direction and having an air pressure connection with the system under control for influencing the armature and initiating the operation of the same and therewith the operation of said controlled member in an oppoiste direction.

6. The combination of a main valve mechanism having a pneumatically operated piston valve member for controlling air pressure to an air operated clutch, a controller valve mechanism for controlling a pressure line leading to the piston valve member and thereby control the operation of the main valve mechanism, said controller mechanism including a pair of mechanically operated valve members, said valve members being positioned in an offset relation and being held against their seat under spring control, a lever member adapted for engagement with said valve members and for alternately opening and closing one of said members, a solenoid having its armature mechanically connected for rocking said lever member, and means connected to the air line of the pneumatically operated valve for exerting pneumatic pressure upon the armature to influence the initiation of the operation thereof when the solenoid is deenergized.

NEAL W. DORMAN.
ROBT. W. HADLEY.